United States Patent [19]

Fay

[11] B 3,989,935

[45] Nov. 2, 1976

[54] METHOD AND APPARATUS FOR CONTROLLING A MATERIAL TREATER

[75] Inventor: Charles Robert Fay, Cincinnati, Ohio

[73] Assignee: Formica Corporation, Cincinnati, Ohio

[22] Filed: Nov. 1, 1974

[21] Appl. No.: 520,075

[44] Published under the second Trial Voluntary Protest Program on February 24, 1976 as document No. B 520,075.

[52] U.S. Cl. .......................... 235/151.1; 235/151.3; 118/8; 118/9
[51] Int. Cl.² ....................................... G06G 7/58
[58] Field of Search ................. 235/151.13, 151.12, 235/151.1, 151.11, 151.3, 151.35, 151.33; 73/23, 150; 118/8, 9; 117/66

[56] References Cited

UNITED STATES PATENTS

| | | | |
|---|---|---|---|
| 3,073,153 | 1/1963 | Petitjean | 73/73 |
| 3,260,642 | 7/1966 | Canter, Jr. | 162/252 |
| 3,378,676 | 4/1968 | Clement | 235/151.3 |
| 3,596,071 | 7/1971 | Doering | 235/151.35 X |

Primary Examiner—Edward J. Wise
Attorney, Agent, or Firm—Frank M. Van Riet

[57] ABSTRACT

An improved process and apparatus are disclosed wherein the resin treatment of a web on a material treater is conducted at optimal throughput with exacting, self-adaptive, feed forward, feedback control.

12 Claims, 7 Drawing Figures

METHOD AND APPARATUS FOR CONTROLLING A MATERIAL TREATER

BACKGROUND OF THE INVENTION

The use of control apparatus in processes for the production of treated materials has become more and more widespread in recent years. The high cost of labor, the increased incidence of decreased quality and the need for more uniformity in products have been the prime motivating forces behind the switch over.

In the treating of materials, e.g. the coating, impregnation etc. and drying of materials such as paper, cloth etc., it has especially become increasingly desirable to utilize a fully automatic process and U.S. Pat. No. 3,596,071 is directed to a system which approaches such a realization. This patent discloses and claims a method and apparatus for the control of a coater and dryer wherein variables such as moisture content, resin solids concentration, percent resin and percent volatiles are measured and/or computed according to various mathematical formulae. The computed values are then used to control the rate of resin application and the drying rate of the impregnated material. The controls effected by the patentee are of the conventional feedback type which are inadequate on high speed treaters. High speed, flexible usage digital computers permit more complex control schemes to be not only feasible but desirable.

SUMMARY

I have now discovered a new and novel improvement which overcomes many of the difficulties exhibited by prior art control procedures and apparatus in the treatment of material webs. My invention utilizes a treater model to continuously calculate and control line speed to a maximum and oven temperatures as needed to maintain the desired drying as measured by %Va.

With the old controls mentioned in the above patent, control actions are only possible every 60–120 seconds or more. At treater speeds of 500–1,000 feet per minute of web, considerable out-of-limits material can be produced before a control action to correct %Ra or %Va is possible.

Through self-adaptive, feed-forward and feedback control, my invention controls the drying process of a material treater, at optimal throughput rates, an impossible achievement utilizing the above-mentioned patented system.

Furthermore, my novel process and apparatus do not attain optimal throughput under the constraints of a maximum line speed and maximum web temperature as in application, Ser. No. 446,076, filed Feb. 26, 1974, now U.S. Pat. No. 3,845,287, which involves the use of many tuning parameters. The instant invention does not require the use of any manually chosen tuning constants. The continuous calculation of one tuning parameter from the measured dryer oven temperatures and material treater line speed assures that the desired specification line speed is maintained.

My novel process and apparatus constitute a very exacting control system that calculates the required dryer parameters to assure the optimal operation of the treater. The one tuning factor is continuously calculated, is always at its optimal value and therefore enables optimal dryer performance. The so-called tuning factor ($h_A$) does not require any on-line tuning techniques, since it is self-adaptive, by virtue of the continuous monitoring of the actual process and calculation procedure therefor. Thus, on-line trial and error tuning is eliminated.

The instant invention can be used to optimally control the drying operation of any material treater.

DESCRIPTION OF THE INVENTION INCLUDING PREFERRED EMBODIMENTS

My invention is the method and apparatus for controlling the drying operation of a material treater at optimal throughput, with an exacting, accurate, self-adapting, feedforward, feedback control system. My invention utilizes the film coefficient, $h$, used either as $h_i$ or $h_A$, depending on the need, calculated similarly to copending application, Ser. No. 520,063, filed concurrently herewith, and hereby incorporated herein by reference, to calculate the average oven temperature set point, $T_{AS}$, to control the drying operation to a given %Va specification value. This oven temperature set point is the oven temperature required to obtain a given throughput rate, line speed specification. Since the oven response to set point changes is slow due to the design of the oven and the time necessary to raise and/or lower temperatures therein, compared to the response to line speed changes which are virtually instantaneous, the line speed set point, LSSP, is changed to correspond to the actual average oven temperature, $T_A$, at a specific instant. Thus, the material treater drying operation is optimized, with the dryer operating at %Va specification and at line speed specification. The $h_A$ value is, in reality, the only tuning factor involved in the control algorithms. This $h_A$ value is a self-adaptive tuning factor since it is calculated continually. The resin-web drying changes occurring in the dryer effect corresponding changes to the $h_A$ value. Controllers are provided to control the material treater line speed at the desired level and the oven temperatures as required to give %Va spec. at line speed spec. Thus, no trial and error or other tuning techniques are required.

Figure 1:
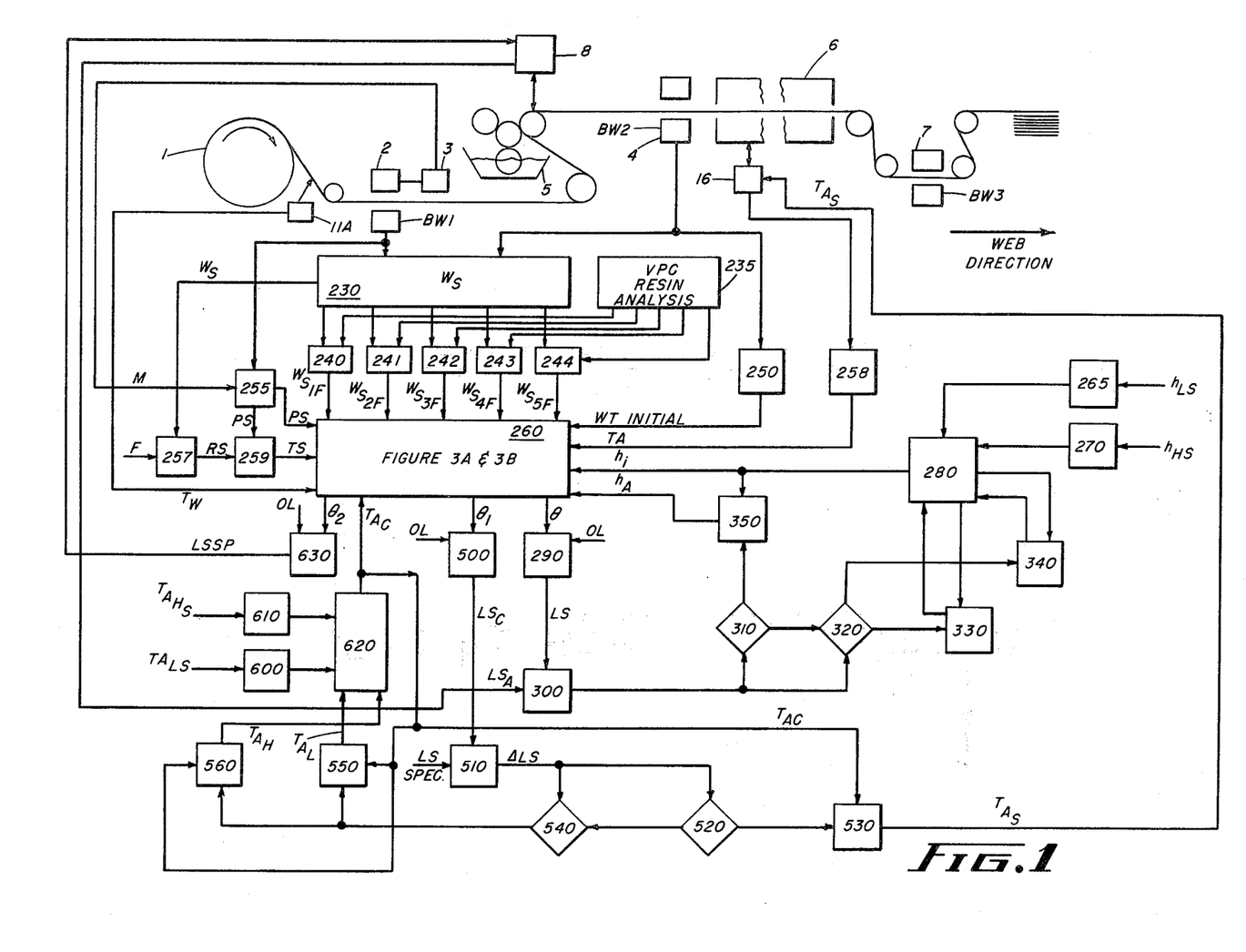
FIG. 1 is a diagrammatic view of a coating and drying process for a material treater, showing three beta gauges, a reverse roll coater, dryer, cutter and stacking equipment and the control system configuration required to conduct the process at optimum throughput including means for calculating and controlling line speed in accordance with oven temperature as required by a specific volatile percentage in the impregnated material.
Figure 3A:
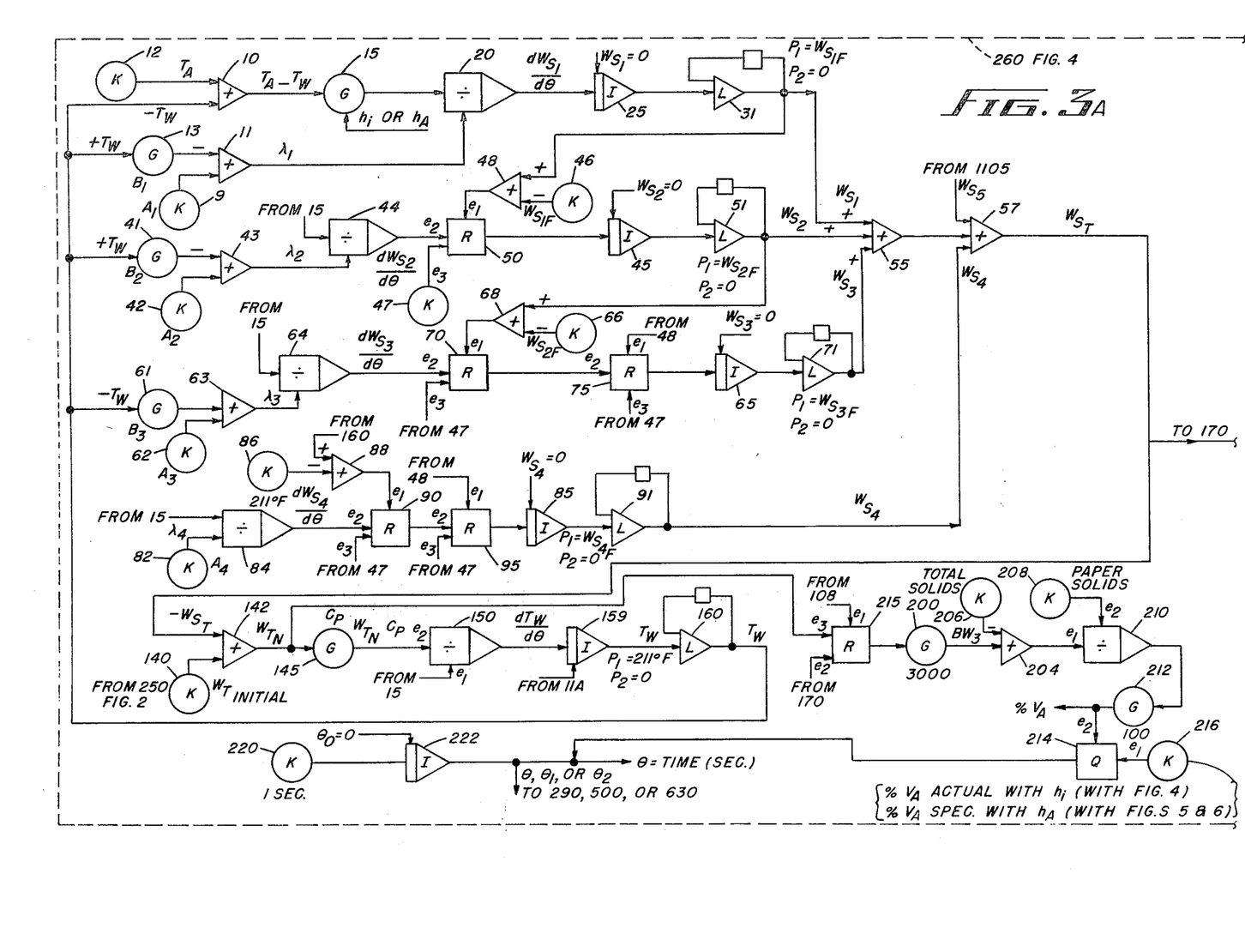
FIG. 3A and 3B is the Treater Model Analog Diagram used in the control system of the instant invention.

The beta gauge system utilized in my invention (FIG. 1) is detailed in U.S. Pat. No. 3,596,071. The %Ra resin and the %Va volatiles can be but are not restricted to the same calculations; e.g., $$\% \text{ Resin} = \%Ra = \frac{\text{Resin Solids}}{\text{Paper Fiber}} = \frac{(BW_2 - BW_1) F}{BW_1 \left(\frac{1-\%M}{100}\right)} \times 100$$

$$\% \text{ Volatiles} = \%Va = \frac{BW_3 - \left[(BW_2 - BW_1)F + BW_1 \left(\frac{\%M}{1-100}\right)\right]}{BW_1 \frac{1-\%M}{100}} \times 100$$

$$= \frac{\text{Residual Volatiles}}{\text{Paper Fiber}}$$

where:
- $BW_1$ = raw paper basis weight (No./3,000 sq. ft.)
- $BW_2$ = raw paper + wet resin basis weight (No./3,000 sq. ft.)
- $BW_3$ = dried treated paper basis weight (No./3,000 sq. ft.)
- F = ASTM resin solids fraction (or solids fraction from an instrument response.)
- %M = % paper moisture Referring to FIG. 1, the fibrous web of paper, cloth, etc. is in roll form at the raw web roll 1, and the raw web passes around any suitable aligning means and the raw web basis weight $BW_1$ thereof is measured by beta gauge 2. Web moisture is measured by moisture gauge 3. The web passes through coater 5, shown as a four roll reverse roll coater, through the wet resin beta gauge 4, which measures $BW_2$, into a dryer 6, and the final dried (treated) weight ($BW_3$) is measured by beta gauge 7. These measurements are then used to calculate %Va spec., or %VA actual, via the above formula which is then an input to 216 of FIG. 3A. Temperature sensor-controller 16 measures and controls the actual average oven temperature, $T_A$. Line speed sensor-controller 8 measures the actual line speed, $LS_A$, while web temperature sensor 11A measures the web temperature, $T_W$.

Figure 2:
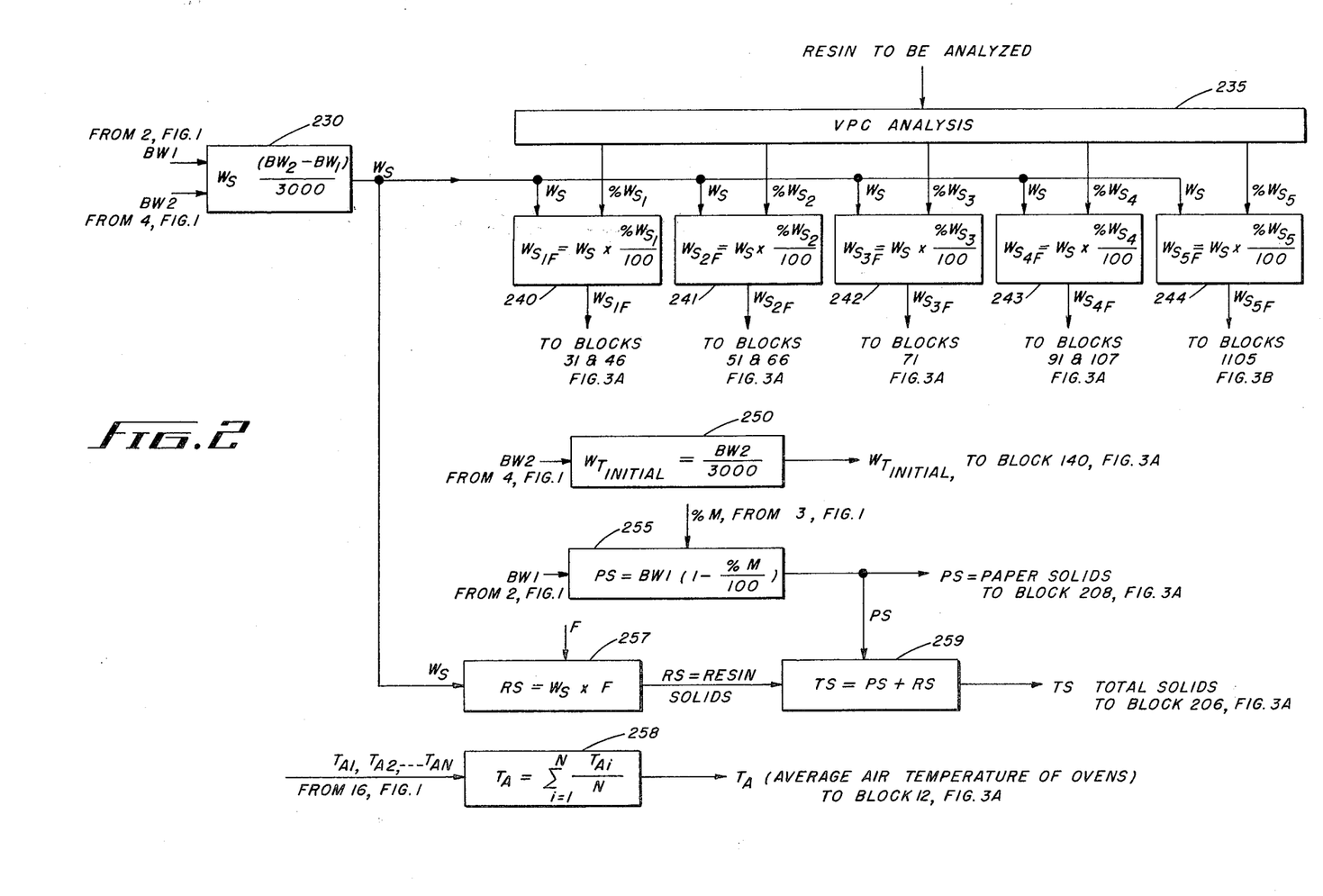
FIG. 2 is a diagram showing the calculations involved in determining the inputs to the Treater Model Analog Diagram of FIG. 3A and 3B.
Figure 3B:
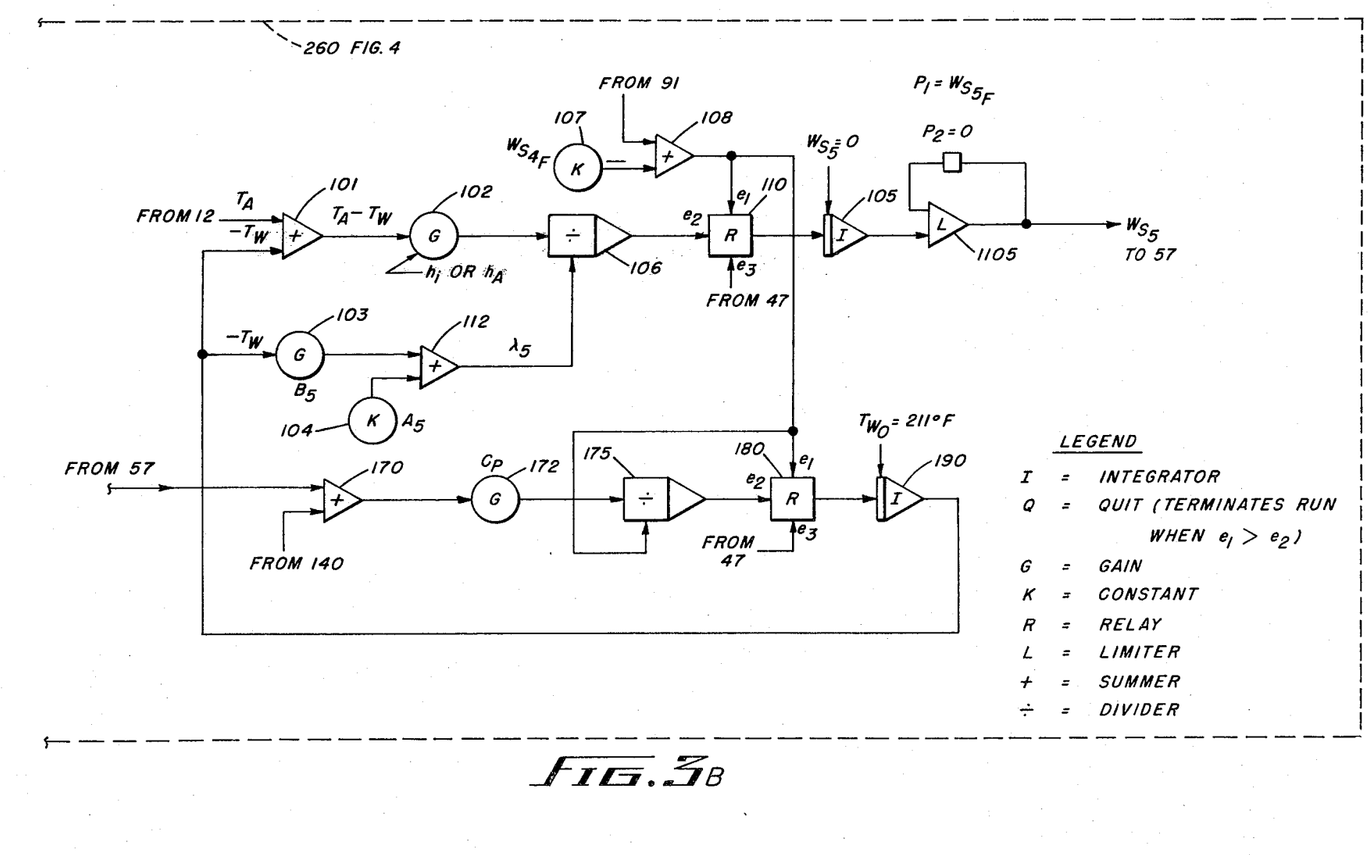

To calculate the film coefficient, $h_A$, it is necessary to relate the $h_A$ value to the drying of a given resinweb system. FIGS. 2 and 3A and 3B are examples of a means that can be used to relate $h_A$ values to the drying of a resinweb system through a treater model, a mathematical model of the drying operation of a material treater. The remainder of FIG. 1, incorporates the diagrams of FIGS. 2–6 and how they relate to the coater and dryer system.

FIG. 2 is a block diagram showing the calculations of the inputs to the Treater Model, FIG. 3A and 3B. Referring to FIG. 2, block 235 gives the Vapor Phase Chromotograph (VPC) analysis of the resin with which the given web is coated. This could be replaced by any off-line analysis or any online continuous measuring device which could be used to determine the percentage composition of the solvents in the resin system. For the example under study, five solvents components are involved and are analyzed, with resulting %'s by weight given as $\%W_{S_1}$, $\%W_{S_2}$, $\%W_{S_3}$, $\%W_{S_4}$, and $\%W_{S_5}$. Block 230 calculates $W_s$, the total weight of wet resin (resin solvents plus solids) per square foot, from $BW_1$ (2, FIG. 1) and $BW_2$ (4, FIG. 1) basis weight readings, in lbs. per 3,000 sq. ft. $W_s$ and $\%W_{S_1}$ are the inputs to block 240, which calculates $W_{S_1F}$ (the final weight of the first solvent components in lbs. per sq. ft.), inputs to block 31 and 46, respectively, of FIG. 3A. In the same manner, $W_{S_2F}$ is calculated in block 241 and is used as inputs to blocks 51 and 66, respectively, of FIG. 3A, $W_{S_3F}$ is calculated in block 242, and is used as an input to block 71 of FIG. 3A, $W_{S_4F}$ is calculated in block 243 and is used as inputs to blocks 91 and 107, respectively, of FIG. 3A, and $W_{S_5F}$ is calculated in block 244 and is used as an input to block 1105 of FIG. 3B. The initial web wet weight (weight of web after coating, $BW_2$ divided by 3,000), $W_{T\ initial}$, in lbs. per sq. ft. is calculated in block 250, and is the input to block 140, FIG. 3A. Block 255 calculates paper solids (PS) (web solids), from inputs to block 255 of $BW_1$ (from 2, FIG. 1) and %M, moisture from 3, FIG. 1, or a constant manual entry, with PS being an input to block 208, FIG. 3A and also to block 259. This moisture input is not a necessary portion of the invention but is presented here only as a preferred embodiment. Note that if the %M were a constant manual entry of zero, the method would be identical to no input of moisture. Hence the previous equations for %Ra and %Va would be modified accordingly by replacing all $BW_1 (1-\%M)/100$ with $BW_1$. Block 257 calculates the Resin Solids (RS) from $W_S$, from block 230, and F, the resin solids fraction, as determined by the ASTM solids test or by instrumentation, a manual M continuously measured or data base entry. The RS value should be multiplied by 3000 in order to equate the bases of the inputs RS and PS in the next calculation. Block 259 calculates Total Solids (TS) from Resin Solids (RS), block 257, and Paper Solids (PS), block 255, and TS is the input to block 206, FIG. 3A. Block 258 calculates the actual average oven air temperature, $T_A$, from the individual zone air temperatures, $T_{Ai}$'s ($T_{A1}$, $T_{A2}$ ... $T_{An}$) from block 16, FIG. 1. $T_A$ is then the input to block 12, FIG. 3A.

FIG. 3 is a Treater Model Analog Diagram, that is solved either on an analog computer, or by using a digital computer to solve an equivalent digital program.

The following assumptions were made in developing the treater model, the distributed parameter mathematical model of the dryer (modelling the dryer of 1 sq. ft. of web as it passes through the dryer):

1. Specific heat of the wet web (Cp) can be considered a constant.
2. The changes in humidity of the air in the dryer can be neglected due to the large air volumes.
3. The heat is transferred to the treated web entirely by convection from the heated air.
4. The constant rate of drying equation well represents the total drying in the oven of the treater.
5. The solvents are removed in the order of increasing boiling points and increasing vapor pressures, with the exceptions of phenol and water.
6. Phenol and water are removed as an azeotrope at 211°F., the composition of the azeotrope being 90.8% by weight water, 9.2% by weight phenol.
7. Additional phenol, due to its high boiling point and low vapor pressures at lower temperatures, and due to the presence of the azeotrope with water at 211°F., will not be removed by itself until after the water present has been used up by the azeotrope.

8. No chemical reaction occurs during the treating operation.

Considering the constant rate of drying, at steady state the heat that flows into the web must be equal to that removed by the evaporated solvents. When air is the only heat source (convective heat transfer only), the balances are as follows:

$$\frac{dQ}{d\theta} = hA(T_A - T_w) \qquad (1)$$

$$\frac{dW_{si}}{d\theta} = \frac{dQ}{d\theta}/\lambda i \qquad (2)$$

thus:

$$\frac{dW_{si}}{d\theta} = \frac{hA(T_A - T_w)}{\lambda i} \qquad (3)$$

for the heating of any material:

$$\frac{dQ}{d\theta} = W_{T_n} Cp \frac{dT_w}{d\theta} \qquad (4)$$

thus:

$$\frac{dT_w}{d\theta} = \frac{hA}{W_{T_n} Cp}(T_A - T_w) \qquad (5)$$

where:
$dQ/d\theta$ = rate of heat absorption, Btu/sec.
$h$ = film coefficient or convective heat transfer coefficient, $Btu_2$/sec. ft. °F.
$A$ = area of heat transfer surface, sq. ft.; = 1 sq. ft. (basis of calculations)
$T_A$ = air temperature, °F.
$T_w$ = web temperature, °F.
$dW_{si}/d\theta$ = rate of removal of solvent $i$, lbs./sec.
$C_p$ = heat capacity, Btu/lb.
$W_{T_n}$ = weight of 1 sq. ft. of web in dryer, at time $\theta$., pounds.
$\lambda i$ = latent heat of vaporization of component i, Btu/lb.

Equation 3 is used to solve for $W_{si}$ and equation 5 is used to solve for $T_w$. These two differential equations are solved simultaneously using an analog computer programmed as shown in FIG. 3A and 3B. Referring to FIG. 3A and 3B, the treater model diagram will be described as it relates to phenolic treated paper. Starting at pot 12, $T_A$, the actual average air temperature of the ovens, and $-T_W$, the web temperature are summed by amplifier 10. The resultant $T_A-T_W$ signal is passed through a potentiometer 15 with $h_i$ from 280 FIG. 4 to give a gain, to obtain $h_i$ ($T_A-T_W$). The $h_i$ is used with %Va actual in block 216. Correspondingly, the $h_i$ can be replaced with $h_A$ here and in all subsequent equations of the model when used with %Va spec. for FIGS. 5 and 6. The latent heat of vaporization for component 1 (methanol in this case) is calculated for the web temperature $T_W$, by pots 13 and 9 ($B_1$ and $A_1$ are constants) being summed by amplifier 11. The division circuit 20 then calculates $dW_{s1}/d\theta = h_i (T_A-T_W)/\lambda 1$ ($A=1$ sq. ft.), equation 3.

Integrator 25 solves $dW_{s1}/d\theta$ for $W_{Sl}$. Limiter 31 limits the integrator 25 output to the total weight $W_{S1F}$) of methanol present in the resin used for impregnating the raw paper web. In the same manner, the other alcohols, ethanol 51 and isopropanol 71, are removed during the drying operation. The water:-phenol azeotrope 91 is removed at the azeotrope temperature of 211°F., by holding the web temperature during azeotrope removal at 211°F.

Once the water:phenol azeotrope is removed, the web temperature again increases as phenol block 1105 is removed, until the final actual %Va or %Va spec. is obtained. The %Va calc. is continuously calculated as described below.

Amplifiers 55 and 57 are used to sum the weight of the components removed by drying at a given time. The total weight removed $W_S$ from Amplifier 57 is inputted to Amplifier 142, along with $W_T$ initial, pot 140, the initial weight of the raw paper and wet resin, ($BW_2/3,000$) in lbs./sq. ft., from block 250, FIG. 2. The resultant $W_{T_n}$, the weight remaining after drying, is then multiplied by Cp 145 to form $W_T$ Cp. Divide circuit 150 gives (see equation 5) $dT_w/d\theta = h_i (T_A-T_w)W_{T_n}$ Cp.
(since A=1 sq. ft.) and integrator 159 solves for $T_W$ as a function of time. Limiter 160 limits the output of integrator 159 to 211°F., the water:phenol azeotrope temperature. Once the azeotrope is removed, the analog circuit of Amplifier 101 through Integrator 190 calculates the weight 105 of phenol removed and the web temperature during the phenol removal 190. Relay 215 selects the desired $W_{T_n}$ which is multiplied by 3,000 200 to obtain $BW_3$, in lbs./3,000 sq. ft. %Va is then calculated by Amplifier 204, pots 206, 212 and divide circuit 210.

The %Va actual (the desired model output) is the input to block 216. Block 214 compares $e_2$ (%Va calc.) to $e_1$ (%Va actual). If $e_1$ is greater than $e_2$, the computer run is terminated. Block 220 inputs a time base (for example, 1 second) to block 222, which is an integrator with an initial value of 0. The output from integrator block 222 is the time ($\theta$) in seconds required for the model to obtain the %Va calc.=%Va actual i.e. the drying time. This output corresponds to the Treater Model output of block 260, FIG. 4, using $h_i$. Correspondingly, $\theta_1$ is the output from the Treater Model of block 260 in FIG. 5, using $h_A$, and $\theta_2$ is the output from the Treater Model of block 260 in FIG. 6, also using $h_A$. It should be noted that $e_1$ is the first input to a given block $e_2$ the second and $e_3$ the third, in all instances.

Figure 4:
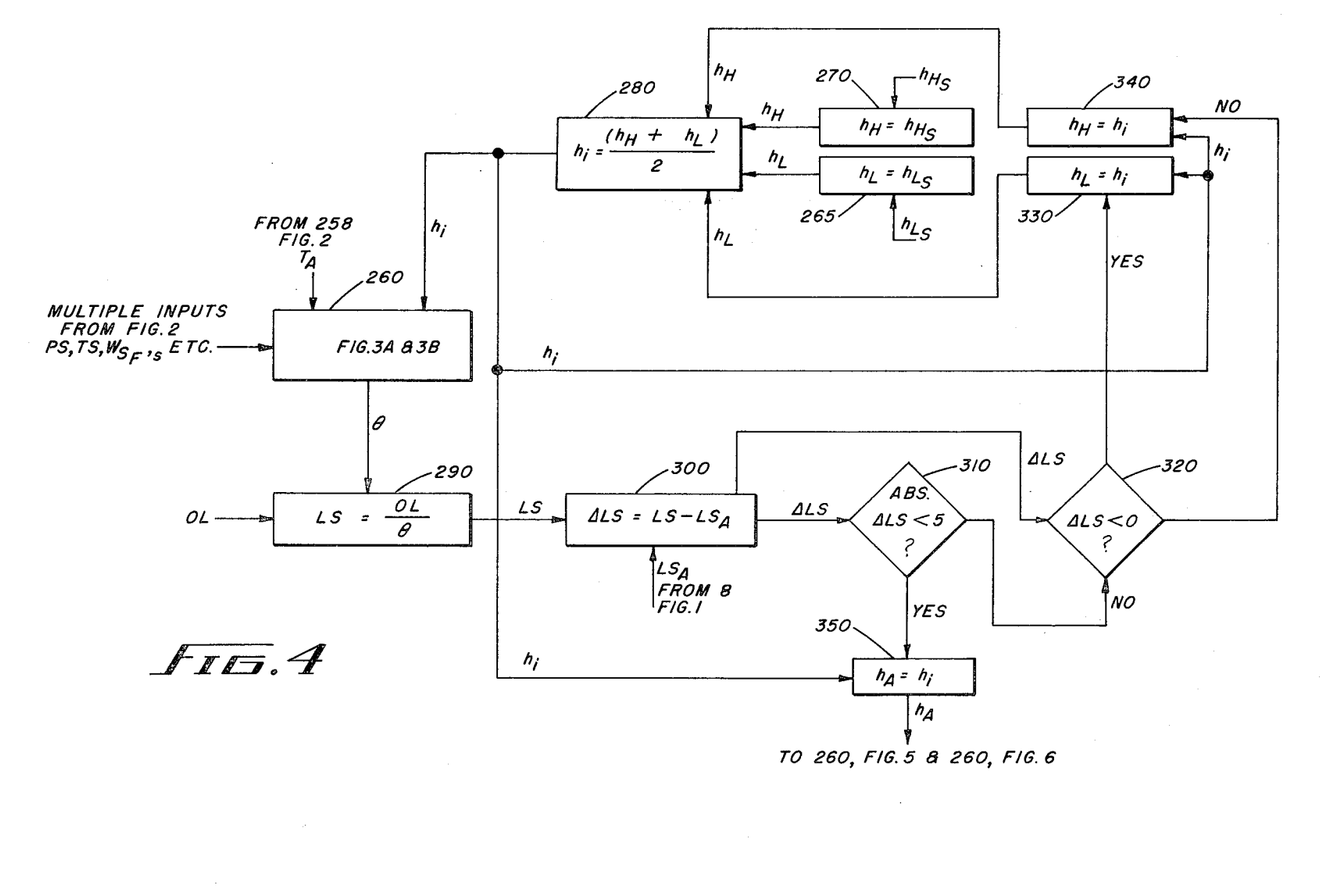
FIG. 4 is a diagram for determining the tuning factor $h_A$ of the instant invention.

FIG. 4 is a block diagram showing an example of the determination and calculation of $h_A$, the tuning factor input to block 260. An "interval halving" convergence method, a well known convergence calculation method, is used to calculate $h_A$, the film coefficient. Any similar convergence method or iterative technique (e.g. Newton-Raphson, Wegstein, secant, etc.) familiar to those skilled in the art can be used in FIG. 4 in place of blocks 265 through 350, inclusive, excluding block 290. Starting at blocks 265 and 270, the initial valve of the high $h$, $h_H$, is set equal to an initial estimate high value of $h$, $h_{Hs}$, in block 270, and in the same manner the low value of $h$, $h_L$, is set equal to $h_{Ls}$ in block 265. Block 280 calculates $h_i$ from $h_H$ and $h_L$ with $h_i$ as input to the Treater Model, block 260. The other inputs to block 260 are $T_A$ from block 258, FIG. 2, and TS, PS, $WS_F$'s and the other inputs as detailed on FIG. 2. The Treater Model, block 260, calculates the drying time $\theta$ seconds, as detailed in FIG. 3. Block 290 calculates treater model line speed, LS, from the dryer oven length, OL, and $\theta$. Block 300 calculates $\Delta LS$ from LS and $LS_A$, the actual line speed from block 8, FIG. 1. Block 310 determines if the absolute value (ABS) of ABS (ΔLS) is less than the desired line speed error, e.g. 5. If ΔLS is less than 5, (or any other value desired), the desired convergence has been achieved, and $h_A$ is set equal to $h_i$ in block 350.

If, however, from block 310 the answer is no, with ABS (ΔLS)>5, block 320 determines if ΔLS is less than zero. If the answer is yes, then the $h_i$ value used in the previous calculation of the treater model block 260 is used to improve upon the lower estimate, $h_L$, in block 330, and this $h_L$ is used, along with the same $h_H$ value used previously to calculate a new $h_i$ value and consequently a new $h_A$. This new $h_i$ value from block 280 is used by block 260 to calculate a new $\theta$ value and hence repeat all calculations as previously described, until the desired convergence is achieved in block 310 and $h_A$ is determined. In the same manner, if the answer from block 320 is no, $h_H$ is set equal to $h_i$ in block 340, and this new $h_H$ is used with the previous value of $h_L$ to calculate a new $h_i$ value in block 280, and new $h_A$ value in 350 and the calculations proceed as previously described.

Figure 5:
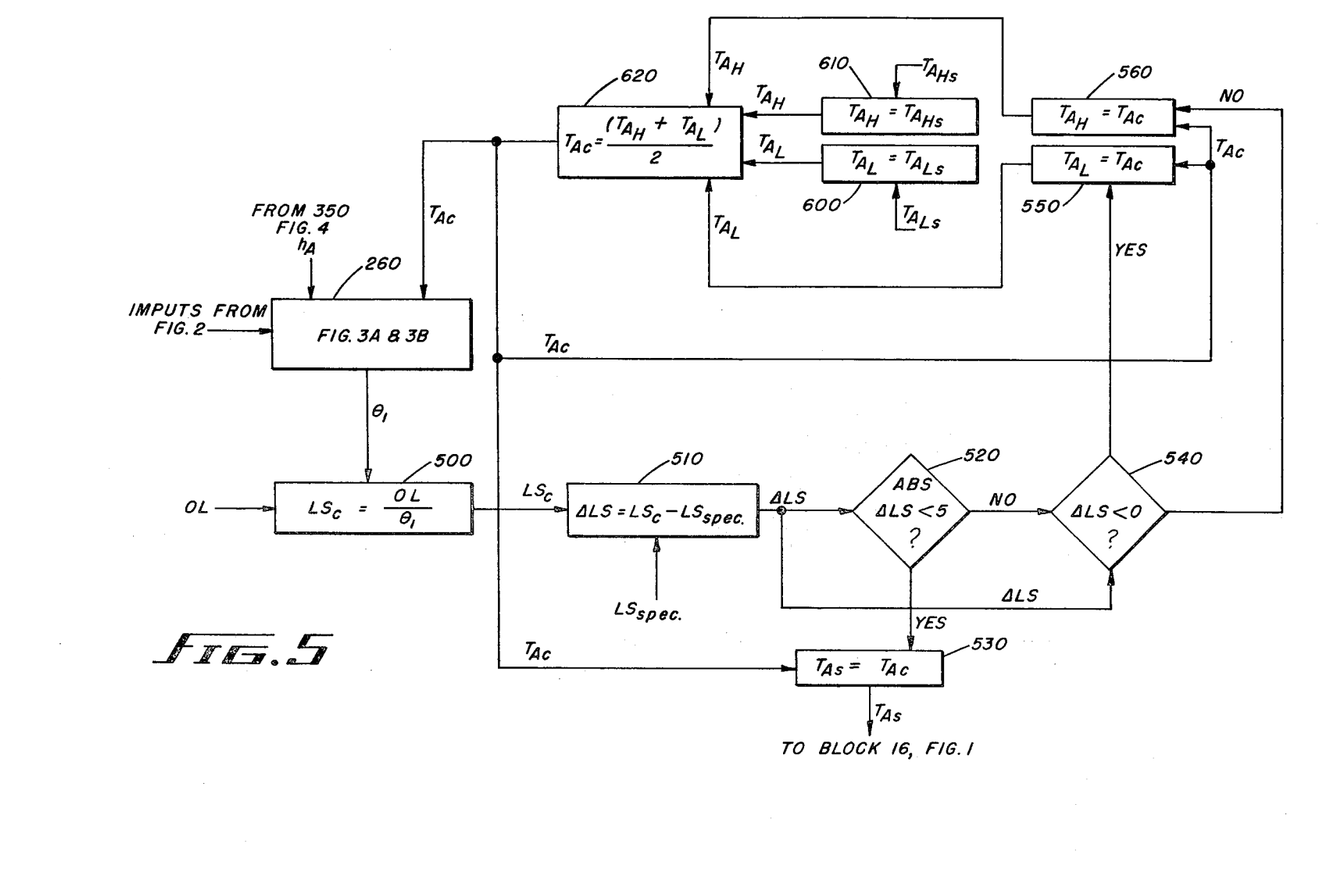
FIG. 5 is an example of a temperature control block diagram using the FIG. 3A and 3B model for reference.

Referring now to FIG. 5, the optimal control of the drying temperature of the treater using the model of FIG. 3A and 3B is shown. A second series of calculations are now performed in block 260 with the previous inputs from FIG. 2. The value $h_A$, from block 350, FIG. 4, is now also an input to block 260. The difference in the calculation of $h_A$ and the calculation of $h$ in the above-identified application filed concurrently herewith, is that the $h_A$ value is calculated based on using the %Va spec. in block 216 of FIG. 3 instead of %Va actual as used therein. %Va actual is calculated from $BW_1$, $BW_2$, $BW_3$, M and F values, however, as in said application.

The average calculated oven temperature, $T_{AC}$, is calculated in FIG. 5 by an "interval halving" convergence method, similar to that used to calculate $h_A$ in FIG. 4. The initial value for the low oven temperature, $T_{AL}$, is set equal to an initial estimate, $T_{ALS}$, in block 600. Similarly, $T_{AH}$, the initial value for the high temperature level is determined from $T_{AHS}$ in block 610. Block 620 then calculates the average oven temperature, $T_{AC}$, using the $T_{AH}$ and $T_{AL}$ values from blocks 610 and 600.

Block 260, the treater model, then calculates $\theta_1$, the drying time in seconds needed to achieve %Va spec. Block 500 calculates the treater line speed, $LS_C$, from $\theta_1$ and the dryer length, OL. Block 510 then calculates ΔLS from $LS_C$ and LS spec., the desired line speed for the material treater. Block 520 determines if the absolute value (ABS) of ΔLS is less than 5 feet per minute, or any other desired value. If the answer is yes, the desired convergence has been achieved, and $T_{AS}$, the oven temperature set point, is set equal to $T_{AC}$, the signal therefrom then being sent back to temperature sensor-controller 16.

If the ΔLS convergence is not achieved in block 520, block 540 determines if ΔLS is less than zero. If the answer is yes, $T_{AL}$, is set equal to $T_{AC}$ in block 550 and this value of $T_{AL}$ is used with the previous value of $T_{AH}$ to calculate a new $T_{AC}$ in block 620 for input to block 260. If, however, the answer from block 540 is no, then $T_{AH}$ is set equal to $T_{AC}$ in block 560, and this value of $T_{AH}$ is used with the previous value of $T_{AL}$ in block 620 to calculate a new $T_{AC}$ for input to 260. Calculations continue until the convergence is achieved in block 520, determining the oven temperature set point, $T_{AS}$, to be used for control in temperature sensor controller 16 of FIG. 1.

Figure 6:
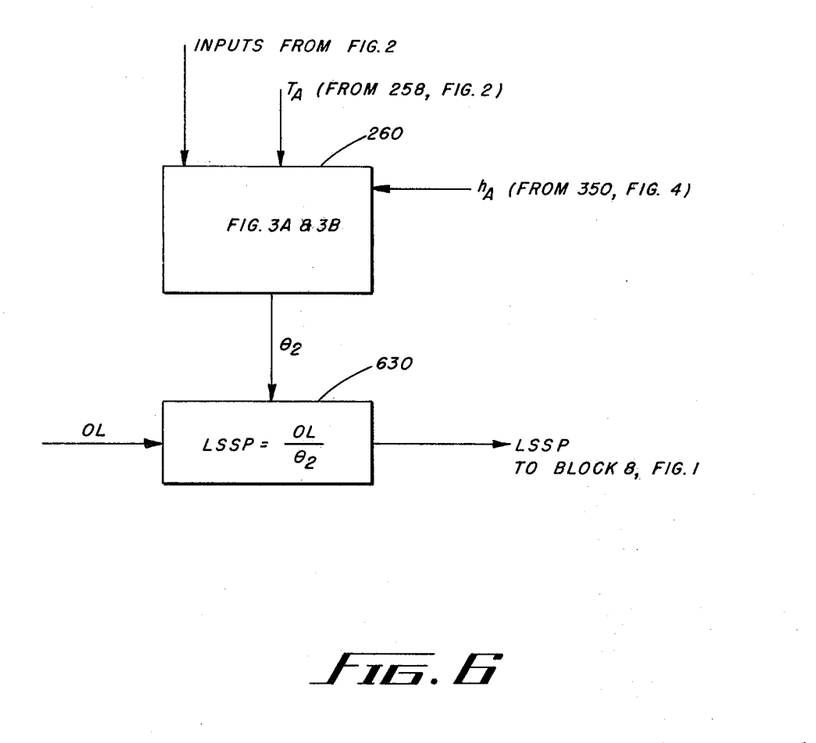
FIG. 6 is an example of a line speed control block diagram using the FIG. 3A and 3B model for reference.

The calculations of FIG. 6 are then performed. The inputs to block 260, the treater model of FIG. 3A and 3B are the same except that $T_A$ is the actual average oven temperature from 258, FIG. 2. Generally, as mentioned above, the response to an oven temperature set point change, $T_{AS}$, is relatively slow, while line speed changes are instantaneous. Therefore, by measuring and inputting $T_A$ to the treater model, block 260, the output (in seconds of drying time) can be used in block 630 to calculate the line speed set point, LSSP, from the oven length, and $\theta_2$, which is used to control the line speed of the material treater via line speed sensor controller 8, at the %Va spec. while the oven is changing from $T_A$ to $T_{AS}$.

Thus, the instant invention achieves the goal of controlling a material treater dryer at optimal conditions (optimal throughput rate) with no experimentally determined tuning factors involved. The control algorithms are selfadaptive in that the $h_A$ value changes to reflect changes in the resin-web drying conditions and is feed forward since a new line speed set point is calculated to achieve a given %Va as the oven temperature changes and is also feedback, in that $h_A$ is calculated from %Va actual which is calculated based on response from a three gauge-beta gauge system.

I claim:

1. A method of controlling the drying of a fibrous host material which has been treated with a resinous solution which comprises:
    1. measuring the weight of said host material before treating and providing a signal (A) representative of said weight before treating,
    2. measuring the weight of the treated material before drying and providing a signal (B) representative of said weight before drying,
    3. measuring the weight of the dried, treated material and providing a signal (C) representative of said weight after drying,
    4. providing a signal (D) representative of the resin solids fraction of said resinous solution,
    5. determining the actual percent volatiles of said dried, treated material from said signals (A), (B), (C) and (D) and providing a signal (E) representative of said percent volatiles,
    6. providing a signal (F) representative of the specification percent volatiles of said dried, treated material,
    7. providing a signal (G) representative of the solvent component percentages and a signal (H) representative of the latent heat of vaporization of each solvent component of said resinous solution,
    8. measuring the line speed of said host material and providing a signal (I) representative of said line speed,
    9. providing a signal (J) representative of the length of the dryer,
    10. measuring the dryer temperature and providing a signal (K) representative of said temperature,
    11. providing a signal (L) representative of the heat capacity of the host material,
    12. measuring the temperature of said host material before treating and providing a signal (M) representative of said temperature before treating,
    13. computing the actual film coefficient ($h_A$) of the material undergoing drying using said signals (A), (B), (C), (D), (E), (G), (H), (I), (J), (K), (L) and (M) and providing a signal (N) representative of said actual film coefficient, 14. providing a signal (O) representative of the specification line speed of said host material,
15. computing the temperature needed in the dryer to achieve said specification percent volatiles at said specification line speed using said signals (A), (B), (D), (F), (G), (H), (J), (L), (M), (N) and (O) and providing a signal (P) representative of said needed temperature,
16. controlling said dryer temperature in accordance with said signal (P),
17. computing the line speed necessary to achieve said specification percent volatiles in accordance with said signal (K) using said signals (A), (B), (D), (F), (G), (H), (J), (K), (L), (M) and (N) and providing signal (Q) representative of said necessary line speed and
18. controlling said line speed in accordance with said signal (Q).

2. A method according to claim 1 including providing a signal (R) representative of the moisture content of said host material before treating and using said signal (R) in steps (5), (13), (15) and (17).

3. A method according to claim 2 wherein said moisture content is continually measured.

4. A method according to claim 1 wherein said actual film coefficient of the material undergoing drying is computed by
   a. calculating from said signal (B) the weight of the treated, undried host material on a per square foot basis and providing signal (S) representative of said weight,
   b. providing a signal (R) representative of the moisture content of said host material before treating and calculating from said signal (A) and said signal (R) the dry weight of the host material and providing signal (T) representative of said dry weight,
   c. calculating from said signal (A) and said signal (B) the amount of resinous solution applied to said host material before drying on a per square foot basis and providing signal (U) representative of said amount of applied solution,
   d. calculating the total resin solids in said host material from said signal (U) and said signal (D) and providing signal (V) representative of said total resin solids,
   e. calculating the total solids of the treated host material from said signal (T) and said signal (V) and providing a signal (W) representative of said total solids,
   f. calculating the final weight of each solvent component from said signal (G), and said signal (U) and providing a signal (X) representative of said final weights and
   g. calculating said actual film coefficient from said signals, (E), (H), (I), (J), (K), (L), (M), (S), (T), (W) and (X) and providing said signal (N).

5. A method according to claim 1 wherein said solvent component percentages are provided by continuous on line measurement.

6. A method according to claim 1 wherein said actual film coefficient is computed by convergence.

7. A method according to claim 1 wherein said step signal (P) is determined by convergence.

8. In a fibrous host material treating process wherein said material is treated with a resinous solution in a treater and dried in a dryer, apparatus for controlling the drying of said treated material comprising 1. first gauge means adjacent to said material for measuring the weight of said material before treating and providing a signal (A) representative of said weight before treating,
2. second gauge means mounted before said dryer and adjacent to said material for measuring the treated, undried weight of said material and providing a signal (B) representative of said treated, undried weight,
3. third gauge means mounted after said dryer and adjacent to said material for measuring the dried weight of said material and providing a signal (C) representative of said dried weight,
4. means for providing a signal (D) representative of the resin solids fraction of said resinous solution,
5. means responsive to said signals (A), (B), (C) and (D) for computing the actual percent volatiles of the dried, treated material and providing a signal (E) representative of said percent volatiles,
6. means for providing a signal (F) representative of the specification percent volatiles of said dried, treated material,
7. means for providing a signal (G) representative of the solvent component percentages and a signal (H) representative of heat of vaporization of each solvent component of said resinous solution,
8. means for measuring the line speed of said material and providing a signal (I) representative of said line speed,
9. means for providing a signal (J) representative of the dryer length,
10. means for measuring the temperature of said dryer and providing a signal (K) representative of said temperature,
11. means for providing a signal (L) representative of the heat capacity of the host material,
12. means for measuring the temperature of said host material before treating and providing a signal (M) representative of said temperature before treating,
13. means responsive to said signals (A), (B), (C), (D), (E), (G), (H), (I), (J), (K), (L) and (M) for computing the actual film coefficient of the material undergoing drying and providing a signal (N) representative of the actual film coefficient,
14. means for providing a signal (O) representative of the specification line speed of said host material,
15. means responsive to said signals (A), (B), (D), (F), (G), (H), (J), (L), (M), (N) and (O) for computing the temperature needed in the dryer to achieve said specification percent volatiles at said specification line speed and providing a signal (P) representative of said needed temperature,
16. means responsive to said signal (P) for controlling the dryer temperature,
17. means responsive to said signals (A), (B), (D), (F), (G), (H), (J), (K), (L), (M) and (N) for computing the line speed necessary to achieve said specification percent volatiles in accordance with said signal (K) and providing a signal (Q) representative of said necessary line speed and
18. means responsive to said signal (Q) for controlling said line speed.

9. Apparatus according to claim 8 comprising fourth gauge means mounted before said treater and adjacent to said host material so as to measure the average moisture content of said material and provide a signal (R)

representative of said moisture content to said means (5), (13), (15) and (17).

10. Apparatus according to claim 8 wherein said means for computing the actual film coefficient of the material undergoing drying includes
   a. means responsive to said signal (B) for computing the weight of the treated, host material on a per square foot basis and providing signal (S) representative of said weight,
   b. means responsive to said signal (A) and a signal (R) representative of the moisture content of said host material before treating for computing the dry weight of the host material and providing a signal (T) representative of said dry weight,
   c. means responsive to said signal (A) and said signal (B) for computing the amount of resinous solution applied to said host material before drying on a per square foot basis and providing a signal (U) representative of said amount of applied solution,
   d. means responsive to said signal (U) and said signal (D) for computing the total resin solids in said host material and providing a signal (V) representative of said total resin solids,
   e. means responsive to said signal (T) and said signal (V) for computing the total solids of the treated host material and providing a signal (W) representative of said total solids,
   f. means responsive to said signal (G), and said signal (U) for computing the final weight of each solvent component and providing signals (X) representative of the final weights, and
   g. means responsive to said signals (S), (T), (W), (X), (E), (H), (I), (J), (K), (L) and (M) for computing said actual film coefficient and providing said signal (N).

11. Apparatus according to claim 10 wherein said means for providing solvent component percentages includes continuous on-line measurement means.

12. Apparatus according to claim 10 wherein said first, second and third gauge means are scanning gauges.

* * * * *